United States Patent
Hennes et al.

(10) Patent No.: US 10,493,902 B2
(45) Date of Patent: Dec. 3, 2019

(54) VEHICLE LIGHTING SYSTEM

(71) Applicant: Ford Global Technologies, LLC, Dearborn, MI (US)

(72) Inventors: Nikica Hennes, Aachen (DE); Philipp Wolf, Cologne (DE); Jessica Rebecca Rausch, Moenchengladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/200,972

(22) Filed: Nov. 27, 2018

(65) Prior Publication Data

US 2019/0202345 A1    Jul. 4, 2019

(30) Foreign Application Priority Data

Jan. 2, 2018  (DE) .......................... 10 2018 200 025

(51) Int. Cl.
| | |
|---|---|
| *B60Q 1/02* | (2006.01) |
| *B60Q 1/24* | (2006.01) |
| *B60Q 1/14* | (2006.01) |
| *F21S 41/657* | (2018.01) |

(52) U.S. Cl.
CPC ............. *B60Q 1/24* (2013.01); *B60Q 1/1415* (2013.01); *F21S 41/657* (2018.01)

(58) Field of Classification Search
None
See application file for complete search history.

(56) References Cited

U.S. PATENT DOCUMENTS

| | | | |
|---|---|---|---|
| 7,195,379 B2 | 3/2007 | Shaffer | |
| 9,566,901 B1* | 2/2017 | Lindsay | B60Q 1/32 |
| 2003/0107323 A1* | 6/2003 | Stam | B60Q 1/10 |
| | | | 315/82 |
| 2012/0081915 A1* | 4/2012 | Foote | B60R 1/12 |
| | | | 362/494 |

(Continued)

FOREIGN PATENT DOCUMENTS

| | | |
|---|---|---|
| CN | 2055456 U | 4/1990 |
| CN | 1144758 A | 3/1997 |

(Continued)

OTHER PUBLICATIONS

"Anti-Glare Device for Car Based on Single Chip Microcomputer," Advanced Materials Research, Scientific.net by Trans Tech Publications Ltd., https://zh.scientific.net/AMR.706-708.1124, 3 pages.

*Primary Examiner* — Anh Q Tran
(74) *Attorney, Agent, or Firm* — Vichit Chea; Price Heneveld LLP (57) ABSTRACT

A method for operating a vehicle comprising at least one light source designed to emit light for illuminating the surroundings of the vehicle is described. The method comprises the following steps: determining whether a road user approaches the vehicle to within a predetermined distance; determining the distance between the road user and the vehicle; and illuminating the surroundings of the vehicle by use of the at least one light source at the side of the vehicle from which the road user approaches the vehicle should the distance between the road user and the vehicle drop below a first threshold distance.

20 Claims, 4 Drawing Sheets

(56) References Cited

U.S. PATENT DOCUMENTS

2015/0353000 A1* 12/2015 Kowatzki ................ B60Q 1/24
                                                           315/77
2017/0368984 A1* 12/2017 Salter ...................... F21S 41/00
2018/0304807 A1* 10/2018 Boesch ................ G08G 1/0965

FOREIGN PATENT DOCUMENTS

| CN | 2450005 Y | 9/2001 |
| CN | 20249114 U | 9/2012 |

* cited by examiner

VEHICLE LIGHTING SYSTEM

FIELD OF THE INVENTION

The present invention generally relates to vehicle lighting, and more particularly relates to a vehicle lighting system and method for operating a vehicle with a lighting apparatus.

BACKGROUND OF THE INVENTION

Blinding lamps from oncoming vehicles, particularly when driving at night or in darkness, may be very uncomfortable and bothersome for drivers in the opposite lane or drivers driving in the opposite direction. This is the case, in particular, on roads outside of towns, where there is no street lighting, and on roads on which there is two-way traffic, for example overland roads. Therefore, increasingly there are new technologies for less blinding lamps. In this context, for example, the direction of the light beam is lowered or light which could blind other drivers from time to time is blocked. In principle, there is a need for further solutions which reduce or avoid other road users being blinded by lamps and which consequently reduce the risk of accidents that arises in this context.

While traveling on footpaths in regions with little or no street lighting, pedestrians typically have to rely on illuminating the footpath themselves, for example by use of lamps or torches. In this context, too, there is an interest for energy-saving and cost-effective solutions which improve the lighting situation of footpaths. This relates to cycle paths in the same way. At the same time, pedestrians and cyclists are also illuminated for other drivers, as a result of which they are not overlooked as easily.

The document CN 2450005 Y describes lamps for motor vehicles which, in the case of oncoming traffic, partly change their direction.

It would be desirable to make available an advantageous method for operating or for operation of a vehicle, an advantageous lighting apparatus and a vehicle, as a result of which arising hazards due to lamps blinding the oncoming traffic are reduced.

SUMMARY OF THE INVENTION

According to one aspect of the present disclosure, a method for illuminating a side of a vehicle is provided. The method includes the steps of determining a road user approaching the vehicle, determining a distance between the road user and the vehicle, and illuminating with at least one light source a side of the vehicle from which the road user approaches the vehicle when the distance between the road user and the vehicle drop below a first threshold distance.

According to another aspect of the present disclosure, a lighting system for a vehicle is provided. The lighting system for a vehicle includes a device for determining a road user approaching the vehicle and determining the distance between the road user and the vehicle, and at least one light source for illuminating a side of the vehicle from which the road user approaches when the distance is below a first threshold distance.

According to yet a further aspect of the present disclosure, a vehicle is provided. The vehicle includes a device for determining a road user approaching the vehicle and determining a distance between the road user and the vehicle, and at least one light source for illuminating a side of the vehicle when the distance is below a first threshold distance.

Further features, properties and advantages of the present disclosure are described in more detail below on the basis of exemplary embodiments and with reference to the attached figures. All features described previously and all features described below are advantageous, both individually and in any combination with one another. The exemplary embodiments described below merely represent examples which, however, do not restrict the subject matter of the invention.

These and other aspects, objects, and features of the present invention will be understood and appreciated by those skilled in the art upon studying the following specification, claims, and appended drawings.

DETAILED DESCRIPTION OF THE PREFERRED EMBODIMENTS

An exemplary embodiment of the method is explained in more detail below on the basis of FIGS. 1-4. FIGS. 1-4 show, in each view schematically, a roadway with two lanes 3 and 4, in which oncoming traffic is allowed, in a plan view. A vehicle 1, such as an automobile according to one embodiment, comprises a longitudinal axis 15 and drives in the direction of travel 5 in the lane 3. A road user 2, a vehicle, such as an automobile, in the present embodiment, comprises a longitudinal axis 16 and drives in the opposite direction of travel 6 in the lane 4.

Vehicles 1 and 2 drive with headlamp illumination, for example in the dark or in poor visibility. The light cones of the lamps of vehicle 1 are denoted by reference identifier 7. The light cone of the headlamps of vehicle 2 are denoted by reference identifier 8. Vehicles 1 and 2 approach one another in opposite adjacent lanes as shown. Vehicle 1 is equipped with a lighting apparatus according to one embodiment of the disclosure while vehicle 2 is not equipped with the lighting apparatus.

When the method according to one embodiment is implemented by vehicle 1, a check is initially carried out as to whether an application of the method is allowed. If this is the case, sensors or suitable detectors, for example, are used to determine whether a road user approaches vehicle 1 within a set distance. This is the case shown in FIG. 1 in which vehicle 1 has determined the approach of vehicle 2. When this occurs, optionally vehicle 1 may transmit a signal to oncoming vehicle 2 with the content to deactivate the headlight and/or reduce the intensity of the headlight.

The distance between vehicle 2 and vehicle 1 or the lighting apparatus according to the disclosure is determined within the scope of the method and, should the distance between vehicle 2 and vehicle 1 or the lighting apparatus according to one embodiment drop below a first threshold distance, the lateral or sideways surroundings of vehicle 1 in respect of the longitudinal axis is illuminated by use of at least one light source on the side of vehicle 1 from which vehicle 2 approaches vehicle 1, i.e., on the left-hand side of vehicle 1 in the present example. This is shown in FIG. 2.

Figure 1:
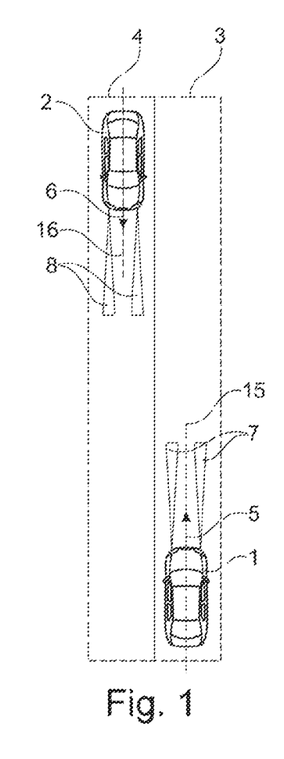
FIG. 1 is a schematic diagram of a two-lane roadway with two vehicles approaching one another, in a plan view.
Figure 2:
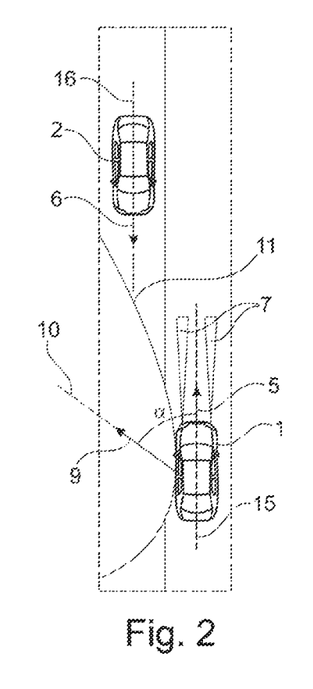
FIG. 2 is a schematic diagram of the roadway shown in FIG. 1, wherein one of the vehicles applies a method according to one embodiment.

In the situation shown in FIG. 2, vehicle 2 has deactivated its headlight according to the transmitted signal. Optionally, vehicle 1 has reduced the light intensity of its headlamp. Reducing the light intensity of the headlamp, at least of the headlamp facing oncoming vehicle 2, such as the left headlamp, can be implemented, for example, as soon as vehicle 2 drops below a second threshold distance from vehicle 1.

Figure 3:
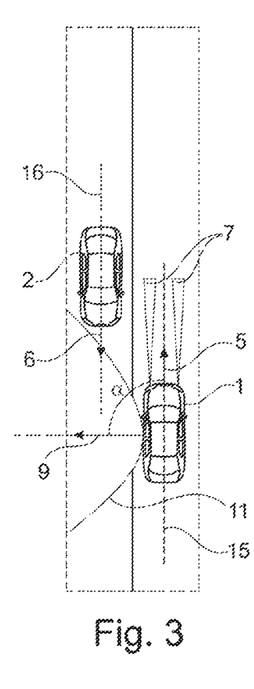
FIG. 3 is a schematic diagram of the roadway shown in FIGS. 1 and 2 from above, in continuation of the method.
Figure 4:
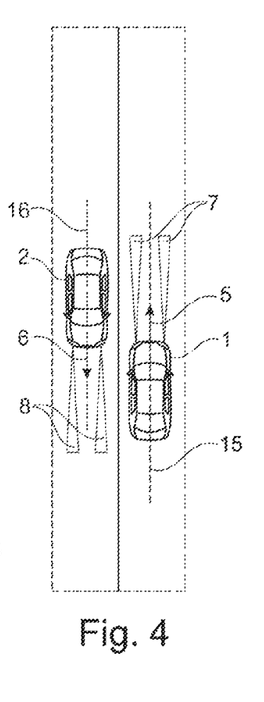
FIG. 4 is a schematic diagram of the roadway shown in the preceding figures from above, at the time at which the method is completed.

In the situation shown in FIG. 2, the light source initially emits light laterally or sideways in the direction of vehicle 2 in order to ideally illuminate the vehicle surroundings, in particular the roadway, immediately in front of vehicle 2. Here, the center axis 10 of the light cone 11 of the light source points in the direction 9 and encloses an angle α with the longitudinal axis 5 of vehicle 1. The angle α initially lies between 45° and 70°. Subsequently, as shown in FIG. 3, it is continuously adapted to the position of vehicle 2 in relation to vehicle 1. In the situation shown in FIG. 3, vehicle 1 or the light source of vehicle 1 emits light in direction 9 at an angle of 90° to the longitudinal axis 5.

As soon as vehicle 2 reaches or drops below a third threshold distance in relation to vehicle 1, vehicle 1 transmits a signal to vehicle 2 with the content of reactivating the lamps, and terminates the lateral or sideways illumination of the vehicle surroundings. If the intensity of the lamps of vehicle 1 were reduced, these are now increased, preferably back to the initial value.

The above-described method can be applied analogously in the case of oncoming bicycles or other motor vehicles, such as trucks or motorbikes, for example. In the case of bicycles, the lateral or sideways illumination increases the visibility of the bicycle.

Figure 5:
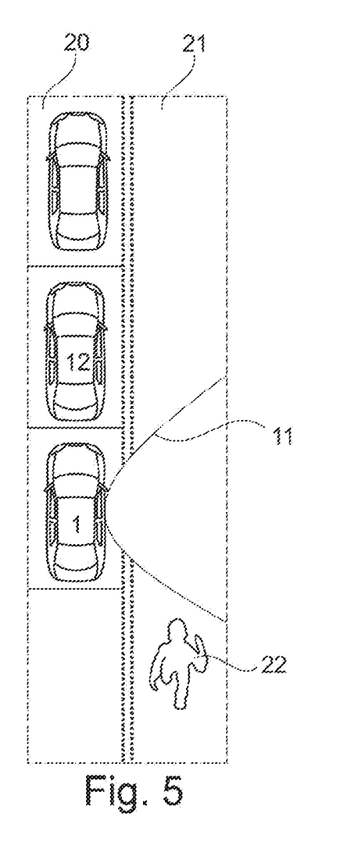
FIG. 5 is a schematic diagram of a shoulder with an adjoining footpath, two vehicles equipped according to another embodiment and a pedestrian from above.
Figure 6:
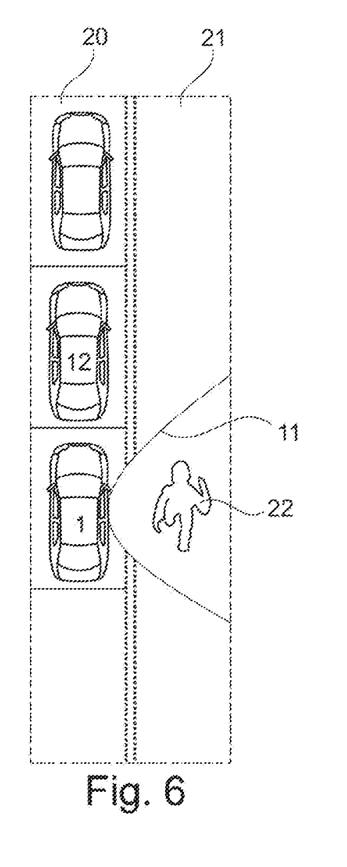
FIG. 6 is a schematic diagram of the shoulder with an adjoining footpath, two vehicles and a pedestrian from above as shown in FIG. 5.
Figure 7:
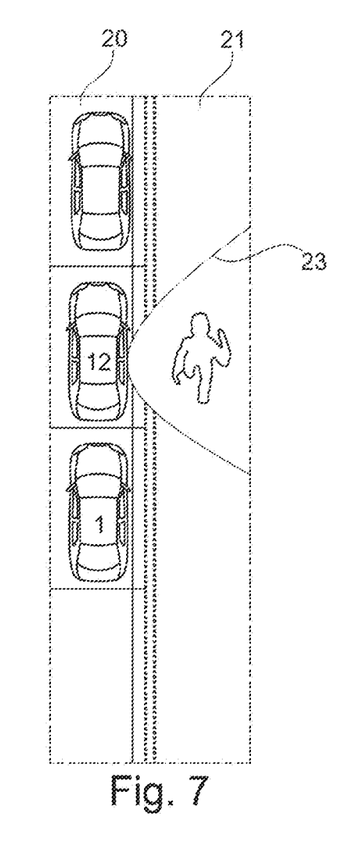
FIG. 7 is a schematic diagram of a shoulder with an adjoining footpath, two vehicles equipped and a pedestrian from above.

A further exemplary embodiment is explained in more detail below on the basis of FIGS. 5-7. FIGS. 5-7 schematically show, from above, parking lanes 20 with an adjacent footpath 21. A number of motor vehicles, including automobiles 1 and 12, are parked in series in the parking lanes 20.

A pedestrian 22 approaches vehicle 1 on the footpath 21. This was detected by vehicle 1 and, when a first threshold value is undershot, the footpath 21 is illuminated 11 laterally by the light source. Once pedestrian 22, as shown in FIG. 6, has passed the light cone 11 and hence vehicle 1, the lateral illumination is deactivated and hence the sideways illumination of the footpath 21 is terminated, as shown in FIG. 7. In the shown variant, the vehicles are parked along the roadway. The method can be applied analogously using the front or tail lamps, for example if the vehicle or the vehicles park transversely to the roadway.

In this example, vehicle 12 likewise has a lighting system according to the disclosure and likewise implements the described method, and so pedestrian 22 likewise finds the footpath 21 illuminated from the side when the pedestrian approaches or reaches vehicle 12. This is represented by the light cone 23. In this way, the footpath 21 is successively illuminated by the parking vehicles. Consequently, continuous illumination is not required.

In a further embodiment, the illumination can be designed with individual images, lettering or using colors in a different way. This is advantageous, particularly for commercial purposes.

Figure 8:
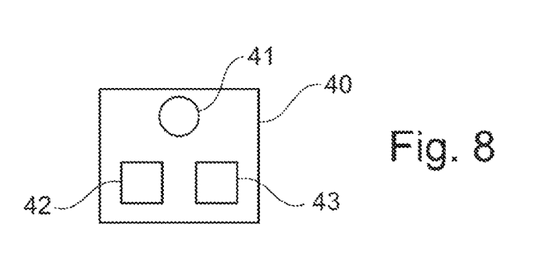
FIG. 8 is a schematic diagram of a lighting apparatus according to one embodiment.

FIG. 8 schematically shows a lighting apparatus 40 according to one embodiment. The lighting apparatus 40 comprises a light source 41, an apparatus 42 for determining whether a road user 2 or 22 approaches the lighting apparatus 40 or vehicle 1 within a set distance, and an apparatus 43 for determining the distance between the road user 2 or 22 and the lighting apparatus 40. The lighting apparatus 40 is designed for a vehicle 1 or 12 and it is suitable for implementing the method according to the disclosure, as already described above.

Figure 9:
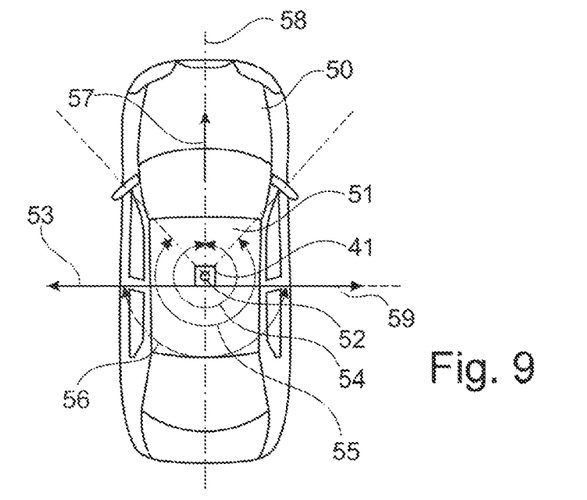
FIG. 9 is a schematic diagram of a vehicle according to one embodiment.

FIG. 9 schematically shows a vehicle 50, for example an automobile, which comprises a lighting apparatus 40 according to one embodiment. The longitudinal axis is denoted by reference sign 58; a longitudinal direction is denoted by an arrow 57 and a lateral direction or transverse direction is denoted by an arrow 53. In the embodiment shown, the light source 41 is arranged on the roof 51 of vehicle 50. It is arranged to be rotatable about a vertical axis 52. In a first embodiment, it is arranged to be rotatable through an angle 54 of about 360 degrees (360°), in a second embodiment, it is arranged to be rotatable through an angle of about 55 of 270 degrees (270°), and, in a third embodiment, it is arranged to be rotatable through an angle of about 56 of 180 degrees (180°). In both embodiments, the light source 41 can emit light both to the left in the transverse direction 53 and in the opposite direction to the right in direction 59.

Figure 10:
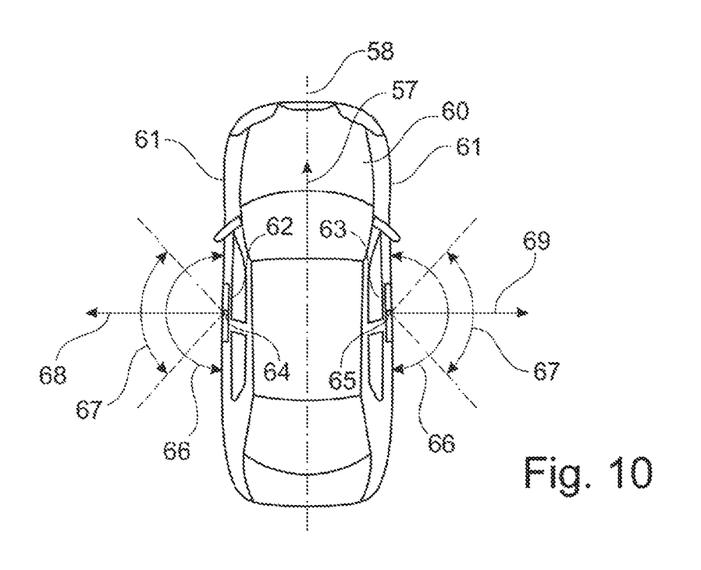
FIG. 10 is a schematic diagram of a vehicle according to one embodiment.

FIG. 10 shows a further embodiment, in which one or two light sources are arranged at a side face 61 of the shown vehicle 60. The light sources 62 and 63 are each arranged to be rotatable about vertical axes 64 and 65 through an angle 66 between about 0 degrees (0°) and 180 degrees (180°), for example through an angle 67 of between about 0 degrees (0°) and 90 degrees (90°). The light source 62 is designed to emit light in the transverse direction 68. The light source 63 is designed to emit light in the transverse direction 69.

Figure 11:
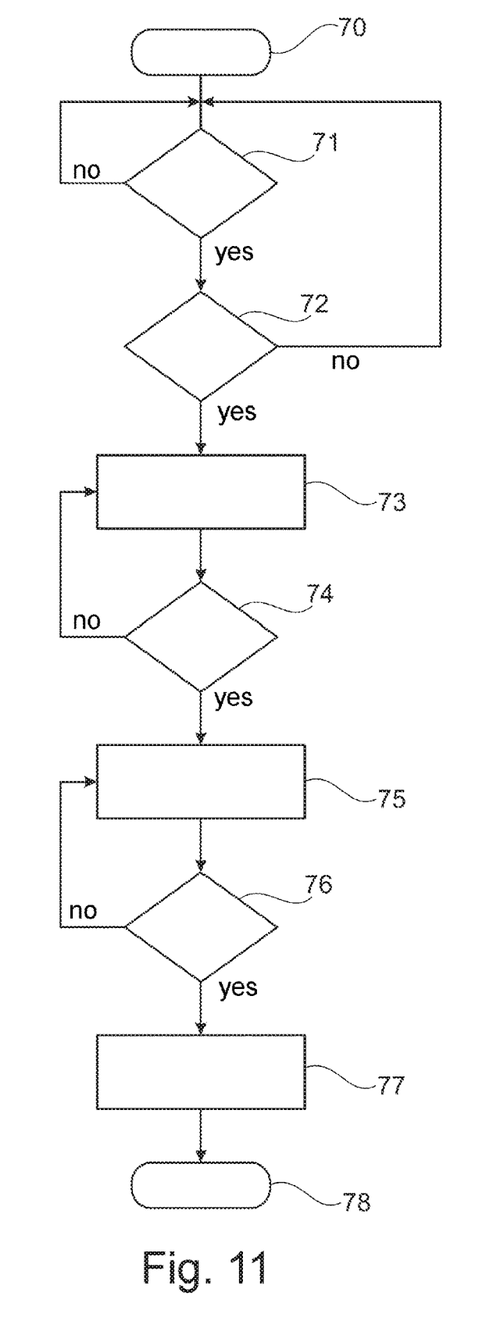
FIG. 11 is a schematic diagram of a variant of the method according to another embodiment in the form of a flowchart.

FIG. 11 schematically shows a variant of the method according to one embodiment in the form of a flowchart. The method starts at step 70. In step 71, a check is carried out as to whether the light conditions make the use of lamps necessary and whether the application of the method is allowed at the used location. Should the answer be yes, the method is continued with step 72. Should the answer be no, the method returns to the start 70.

In step 72, it is determined whether a road user approaches the vehicle within a set distance. Should this not be the case, the method returns to step 71. If it is determined that a road user approaches the vehicle within a set distance, the distance of the vehicle from the road user is determined at step 73 and, optionally, a signal is transmitted to the road user. By way of example, the signal can indicate that the headlamps can be deactivated or the intensity thereof can be reduced.

Subsequently, a check is carried out at step 74 as to whether the distance of the road user from the vehicle has dropped below a first threshold. Should this not be the case, the method returns to step 73. Should this be the case, the lateral or sideways illumination is activated at step 75 and optionally adapted to the position of the road user.

Furthermore, the intensity of the lamp of the vehicle can be reduced and/or the full beam can be deactivated and/or the headlamps can be partly or completely deactivated if a second threshold value of the distance between the road user and the vehicle is undershot. The first and the second threshold value may be identical according to one embodiment.

Subsequently, a check is carried out at step 76 as to whether the road user has dropped below a third threshold value of the distance from the vehicle. Should this not be the case, the method is continued at step 75, such that the lateral illumination is maintained and, optionally, still adapted to the position of the road user. If the third threshold value is undershot, the lateral or sideways illumination is terminated in step 77, such that it is deactivated, and, where necessary, the intensity of the headlamps is returned to the initial value. The third threshold value is advantageously smaller than the first and/or the second threshold value. The method ends at step 78.

The method according to one embodiment for operating or for operation of a vehicle relates to a vehicle comprising at least one light source. The light source is designed to emit light for illuminating the surroundings of the vehicle. In one variant, the vehicle comprises a longitudinal axis and at least one light source is configured to emit light across the longitudinal axis so as to emit light in a sideways or lateral direction in relation to the longitudinal axis.

The method comprises the following steps: it is determined whether a road user approaches the vehicle to within a predetermined distance. The distance between the road user and the vehicle is determined and the surroundings of the vehicle, for example the lateral surroundings of the vehicle in relation to a longitudinal axis of the vehicle, is illuminated by use of the at least one light source at the side or in the direction of the side of the vehicle from which the road user approaches the vehicle should the distance between the road user and the vehicle drop below a first threshold distance. Expressed differently, the surroundings of the vehicle on the side on which the road user moves past the vehicle or passes the vehicle is illuminated. Preferably, the roadway or the path or the road immediately in front of the road user, for example, in front of oncoming traffic, is illuminated. In one embodiment, light is emitted across the longitudinal axis by use of the at least one light source should the distance between the road user and the vehicle drop below a first threshold distance.

The method according to the disclosure is advantageous in that, as a result of the targeted illumination of the surroundings and, in particular, the roadway situated in front of the oncoming road user, there is illumination in the situation where the road user may be blinded. As a result of the illumination in the surroundings in front of the road user, the latter does not peer into darkness and does not have to adapt their eyes within a very short time from a very high illuminance as a result of the lamps of the oncoming vehicle to low lighting after passing the vehicle. Consequently, the roadway of the road user is illuminated in ideal fashion during the entire time when the vehicle and road user pass one another, as a result of which the effect of blinding is significantly reduced. Consequently, the hazards typically caused by the blinding oncoming traffic are reduced at the same time. Furthermore, road users are more visible when using the road and have a better view both within and outside of the vehicle. Pedestrians and, in particular, cyclists, which are otherwise poorly visible, are clearly marked out for other traffic.

In an advantageous embodiment, there is a determination as to whether the application of the method is allowed at the location used by the vehicle prior to the implementation of the method steps already specified above. This is advantageous in that the method is not used superfluously, for example within built-up areas with sufficient street lighting, and does not lead to an illumination of localities that is bothersome to inhabitants. Should the method be used to illuminate traffic areas, for example footpaths or cycle paths, an admissibility condition may consist of the vehicle standing, in particular parking.

In addition or in the alternative thereto, there is a determination as to whether the ambient light has a luminosity below a threshold value prior to the implementation of the steps already specified above. This should avoid the method also being applied if there is no sufficient danger of blinding other road users. By way of example, this may relate to the case where vehicles drive with lamp illumination, even in daylight.

Determining whether the application of the method is allowed at the location used by the vehicle can be implemented, for example, by use of street maps and/or maps and/or GPS (global positioning system) or in any other suitable way.

The used light source which, in particular, is designed to emit light across the longitudinal axis for carrying out the method according to the disclosure can preferably be configured as a lamp. The configuration as a lamp is advantageous in that an illumination of the surroundings and, in particular, of the roadway in front of the road user that is analogous to the usual headlamp is obtained, as a result of which the roadway is illuminated for the road user in a manner that is similar to the conventional illumination by the road user's own headlamp. In particular, it is possible here to avoid jumps in the intensity in the illumination of the surroundings in front of the road user, which in turn can distract or be uncomfortable for the latter.

In one embodiment, the vehicle comprises a roof and a longitudinal axis and the light source is arranged on the roof of the vehicle. In addition or as an alternative thereto, the vehicle can comprise at least one lateral side face in relation to the longitudinal axis and the light source can be arranged at the at least one lateral side face. Arranging the light source on the roof is advantageous in that, in the case of an appropriate configuration, only one additional light source is required for carrying out the method according to one embodiment. Although this may require two light sources under certain circumstances, particularly if the method according to the disclosure should be applied in relation to both sides of the vehicle, arranging at least one light source on one or both side faces of the vehicle is advantageous in that this, on the other hand, allows the at least one light source to be arranged as low as possible, such as level with the remaining lamps, for example. Additionally, laterally arranged light sources can be integrated in an optically improved manner in the overall appearance of the motor vehicle than an arrangement of a light source on the roof, for example.

In one embodiment, the light source is configured to be rotatable about a vertical axis and is rotated about the vertical axis, e.g., through a set angle, when illuminating the surroundings of the vehicle, for example when illuminating the lateral surroundings of the vehicle in relation to the longitudinal axis of the vehicle. By way of example, the light source can be configured to be rotatable through about 360 degrees (360°) about the vertical axis. This is particularly advantageous in conjunction with an arrangement of the light source on the roof. However, the light source can also be configured to be rotatable through an angle between 0 degrees (0°) and 270 degrees (270°). Since an illumination by the light source in the direction of travel of the vehicle is not required, such an angular range is also sufficient for carrying out the method according to the disclosure, to be precise both when arranging the light source on the roof and when arranging the light source on a side face. In principle, the light source can also be configured to be rotatable only through an angle between 0 degrees (0°) and 180 degrees (180°), for example also only through an angle between 0 degrees (0°) and 90 degrees (90°). Such a merely restricted rotatability is more cost-effective and more easily realizable, but nevertheless ensures an efficient implementation of the method, particularly when arranging the light source on a side face.

At least one detector and/or vehicle-to-vehicle communication and/or communication between the vehicle and a mobile appliance, for example a smartphone or smartwatch, may be used to determine whether a road user approaches the vehicle to within a set distance. Particularly the use of vehicle-to-vehicle communication has a multiplicity of advantages. Firstly, it may be possible to dispense with detectors or only use these in exceptional circumstances. Furthermore, the method can be operated in anticipatory fashion, by way of example, the lateral or sideways illumination may remain activated if a plurality of road users approach the vehicle in quick succession. Moreover, it is possible to establish when other road users approach the vehicle in a timely fashion for a significantly longer range than can be determined by use of detectors or sensors. If a detector is used, the latter may comprise, for example, at least one movement sensor and/or at least one radar sensor and/or at least one ultrasound sensor and/or at least one laser sensor.

In principle, the road user can be a pedestrian, a bicycle or a cyclist, or a motor vehicle, for example a moped, a motorbike, an automobile or a truck. The vehicle can comprise at least one headlamp and/or at least one lamp with a full beam or a full beam function. Should the road user drop below a second threshold distance from the vehicle, the light intensity of the at least one headlamp can be reduced or the headlamp can be deactivated and/or the full beam can be deactivated.

In principle, the first threshold distance, at which the illumination of the surroundings, e.g., the lateral or sideways surroundings, of the vehicle is introduced, and the second threshold distance, at which intensity of the headlamp is reduced or the latter is deactivated or the full beam is deactivated, can be identical. However, it is also possible for different threshold distances to be set. In particular, the first threshold distance, at which the surroundings, e.g., the lateral or sideways surroundings, of the vehicle are illuminated, may be greater than the second threshold distance, at which the light intensity is reduced or the full beam is deactivated or the headlamp is deactivated. Thus, the surroundings, e.g., the lateral or sideways surroundings, of the vehicle would initially be illuminated and the typically blinding light would subsequently be removed. An inverted sequence, i.e., setting a higher second threshold distance than the first threshold distance, is likewise conceivable and would lead to the blinding light initially being eliminated and subsequently the surroundings, e.g., the lateral or sideways surroundings, of the vehicle being illuminated.

The illumination of the surroundings, such as the lateral or sideways surroundings, of the vehicle can be reduced or terminated should the road user drop below a third threshold distance, for example a minimum distance or minimal distance, from the vehicle or be situated next to the vehicle. As an alternative or in addition thereto, the light intensity of the at least one headlamp can be increased again or the headlamp can be activated again and/or the full beam can be activated again should road user the drop below the third threshold distance from the vehicle or be situated next to the vehicle.

In an advantageous embodiment, the direction of the lateral or sideways illumination is adapted to the current position of the road user and/or to the movement direction of the road user. This can be realized by virtue of the direction of the lateral or sideways illumination being adapted by rotating the light source, for example about a vertical axis. This is advantageous in that the light cone of the light source can be minimized and an ideal illumination is achieved by continuous rotating of the light source.

Advantageously, a signal can be transmitted to the road user when the illumination, e.g., the lateral or sideways illumination, illuminates an area in front of the road user. Here, the signal can comprise the communication that the full beam can be deactivated and/or the light intensity of at least one headlamp can be reduced and/or at least one headlamp can be deactivated. This vehicle-to-vehicle communication is advantageous in that, provided both the vehicle and the road user are able to illuminate their surroundings, for example their lateral or sideways surroundings, both profit from the dazzle protection according to the disclosure. Moreover, at least as a result of the signal transmission, an advantage for the driver of the vehicle, too, consists of the probability increasing of the road user manually or automatically adopting appropriate measures for dazzle protection.

In an advantageous configuration, the illumination of the surroundings, such as the lateral or sideways surroundings, of the vehicle can be configured individually, for example using a logo, lettering, an image, an individual color design or by other lighting techniques. This lends itself, in particular, if a halting or parking vehicle illuminates an adjoining footpath or cycle path when another road user passes.

The lighting apparatus according to one embodiment for a vehicle comprises at least one light source designed to emit light for illuminating the surroundings of the vehicle, such as transversely to the longitudinal axis of the vehicle to emit in a sideways or lateral direction in relation to the longitudinal axis. The lighting apparatus moreover comprises an apparatus for determining whether a road user approaches the lighting apparatus or the vehicle to within a set distance and an apparatus for determining the distance between the road user and the lighting apparatus or the vehicle. The lighting apparatus is designed to implement a method according to the disclosure, as already described above.

The vehicle according to one embodiment comprises the lighting apparatus. The vehicle can be a motor vehicle, for example an automobile, a truck, a motorbike, a moped or an electrically driven bike (e-bike) or a bike or a wheelchair or a mobility scooter. In principle, the lighting apparatus and the vehicle have the same properties and advantages as the method according to the disclosure already described above.

The present disclosure has one or more of the following advantages: road users are more visible when in traffic and have a better view, both within and outside of a vehicle. As a result of the improved illumination, stress and tiredness of the driver and of other road users are reduced, particularly in poor vision, particularly when driving during twilight or in the night. Cycle paths and footpaths can also be illuminated temporarily in an ideal fashion, even where no street lighting is present or in the case of insufficient street lighting. This increases convenience and safety for pedestrians and cyclists. Moreover, ideal illumination of the vehicle surroundings when entering or leaving the vehicle is possible. Moreover, an advantage arising is that individual illumination for private or commercial purposes is facilitated.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for illuminating a side of a vehicle, comprising:
   determining a road user approaching the vehicle, wherein the road user comprises an oncoming vehicle;
   determining a distance between the road user and the vehicle; and
   illuminating with at least one light source, that is configured to be rotatable about a vertical axis through a set angle, ground in front of the oncoming vehicle to provide lighting in front of the oncoming vehicle for the oncoming vehicle when the distance between the oncoming vehicle and vehicle drops below a first threshold distance.

2. The method as claimed in claim 1, wherein there is a determination as to whether at least one of the application of the method is allowed at the location used by the vehicle and whether the ambient light has a luminosity below a threshold value prior to the implementation of the step of illuminating.

3. The method as claimed in claim 1, wherein the light source is configured as a lamp.

4. The method as claimed in claim 1, wherein the vehicle comprises at least one of a roof, longitudinal axis, and the light source is arranged on the roof of the vehicle, and at least one lateral side face in relation to the longitudinal axis and the light source is arranged at the at least one lateral side face.

5. The method as claimed in claim 4, wherein the light source is rotated about the vertical axis through a set angle when illuminating the side of the vehicle.

6. The method as claimed in claim 1, wherein determining a road user approaching the vehicle to within a set distance is carried out by use of at least one of a detector, vehicle-to-vehicle communication, and communication between the vehicle and a mobile appliance.

7. The method as claimed in claim 1, wherein the road user further comprises a pedestrian, a bicycle or a motor vehicle.

8. The method as claimed in claim 1, wherein the vehicle comprises at least one of a headlamp and a lamp with a full beam, and wherein a light intensity of the at least one headlamp and lamp with a full beam is at least one of reduced and deactivated when the distance between the road user and the vehicle drops below a second threshold distance.

9. The method as claimed in claim 8, wherein illumination of surroundings of the vehicle is reduced or terminated when the distance between the road user and the vehicle drops below a third threshold distance or be situated next to the vehicle.

10. The method as claimed in claim 1, wherein a direction of the illumination is adapted to at least one of a current position of the road user and a movement direction of the road user.

11. The method as claimed in claim 10, wherein the direction of the illumination is adapted by rotating the light source.

12. The method as claimed in claim 1, wherein a signal is transmitted to the road user when the illumination illuminates an area in front of the road user.

13. The method as claimed in claim 12, wherein the signal comprises a communication that at least one of a full beam can be deactivated, the light intensity of at least one headlamp can be reduced, and at least one headlamp can be deactivated.

14. A lighting system for a vehicle, comprising:
   a device for determining a road user, wherein the road user comprises an oncoming vehicle, approaching the vehicle and determining the distance between the road user and the vehicle; and
   at least one light source that is configured to be rotatable about a vertical axis through a set angle for illuminating ground in front of the oncoming vehicle to provide lighting in front of the oncoming vehicle for the oncoming vehicle when the oncoming vehicle approaches the vehicle within a distance below a first threshold distance.

15. The lighting system as claimed in claim 14, wherein the vehicle comprises at least one of a headlamp and at least one lamp with a full beam, wherein at least one of the light intensity of the at least one headlamp is reduced, and at least one of the headlamp and the at least one lamp with a full beam is deactivated when the distance between the road user and the vehicle drop below a second threshold distance.

16. The lighting system as claimed in claim 15, wherein the illumination of the side of the vehicle is reduced or terminated should the distance between the road user and the vehicle drop below a third threshold distance from the vehicle or be situated next to the vehicle.

17. The lighting system as claimed in claim 14, wherein a direction of the illumination is adapted to at least one of a current position of the road user and to a movement direction of the road user.

18. The lighting system as claimed in claim 17, wherein the direction of the illumination is adapted by rotating the light source.

19. The lighting system as claimed in claim 14, wherein there is a determination as to whether at least one of the illumination of the light source is allowed at a location used by the vehicle and whether the ambient light has a luminosity below a threshold value.

20. A vehicle comprising:
   a device for determining a road user approaching the vehicle and determining a distance between the road user and the vehicle, wherein the road user comprises an oncoming vehicle; and
   at least one light source that is configured to be rotatable about a vertical axis through a set angle for illuminating ground in front of the oncoming vehicle to supplement lighting for the oncoming vehicle when the distance between the oncoming vehicle and the vehicle is below a first threshold distance.

* * * * *